(12) United States Patent
Lee

(10) Patent No.: US 9,841,622 B2
(45) Date of Patent: Dec. 12, 2017

(54) DISPLAY DEVICE

(71) Applicant: SAMSUNG DISPLAY CO., LTD., Yongin-si, Gyeonggi-do (KR)

(72) Inventor: Jaesang Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/098,681

(22) Filed: Apr. 14, 2016

(65) Prior Publication Data

US 2016/0363805 A1    Dec. 15, 2016

(30) Foreign Application Priority Data

Jun. 11, 2015 (KR) .................. 10-2015-0082692

(51) Int. Cl.
*H05K 7/02* (2006.01)
*H05K 7/04* (2006.01)
*G02F 1/1333* (2006.01)

(52) U.S. Cl.
CPC ............ *G02F 1/133308* (2013.01); *G02F 2001/13332* (2013.01); *G02F 2001/133317* (2013.01)

(58) Field of Classification Search
CPC .. G02F 1/133308; G02F 2001/133317; H05K 5/0017
USPC ...................................... 361/807, 809, 810
See application file for complete search history.

(56) References Cited

U.S. PATENT DOCUMENTS

| 5,809,676 | A |  | 9/1998 | Sukumoda et al. |
| 6,292,239 | B1 | * | 9/2001 | Nagamura ........ G02F 1/133308 349/58 |
| 6,760,083 | B2 | * | 7/2004 | Lai .................... G02F 1/133308 349/58 |
| 7,511,963 | B2 | * | 3/2009 | Louchart ................ G06F 1/181 361/752 |
| 7,651,062 | B2 | * | 1/2010 | Matsutani .............. F16M 11/10 248/176.3 |
| 7,791,279 | B2 |  | 9/2010 | Kwon et al. |
| 8,477,257 | B2 | * | 7/2013 | Nakano ............. G02F 1/133308 349/58 |

(Continued)

FOREIGN PATENT DOCUMENTS

JP          0916107 A    1/1997
JP       2010039441 A    2/2010

(Continued)

*Primary Examiner* — Hung S Bui
(74) *Attorney, Agent, or Firm* — Cantor Colburn LLP

(57) ABSTRACT

A display device includes: a display panel curved in a first direction; a lower frame; an upper frame coupled to the lower frame; and a fastening member coupling the lower frame and the upper frame, wherein the lower frame includes a first coupling portion protruding toward the display panel, the first coupling portion having a first coupling hole, the upper frame includes a second coupling portion protruding toward the display panel, the second coupling portion having a second coupling hole, the fastening member penetrates the first coupling hole and the second coupling hole to fasten the lower frame and the upper frame together, and a bottom portion of the first coupling portion forms an acute angle with respect to a base portion of the lower frame, and a bottom portion of the second coupling portion forms an acute angle with respect to a base portion of the upper frame.

16 Claims, 4 Drawing Sheets

(56) References Cited

U.S. PATENT DOCUMENTS

| 9,405,141 B2* | 8/2016 | Zhang | G02F 1/133308 |
| 2005/0151894 A1* | 7/2005 | Katsuda | G02F 1/133308 |
| | | | 349/58 |
| 2010/0033648 A1 | 2/2010 | Kaganezawa | |
| 2010/0302457 A1* | 12/2010 | Yamamoto | G02F 1/133308 |
| | | | 348/725 |
| 2011/0096262 A1* | 4/2011 | Kikuchi | G09F 9/301 |
| | | | 349/58 |
| 2014/0347594 A1* | 11/2014 | Ando | H05K 5/02 |
| | | | 349/58 |

FOREIGN PATENT DOCUMENTS

| KR | 1020070093545 A | 9/2007 |
| KR | 20100110465 A | 10/2010 |

\* cited by examiner

DISPLAY DEVICE

This application claims priority to Korean Patent Application No. 10-2015-0082692, filed on Jun. 11, 2015 and all the benefits accruing therefrom under 35 U.S.C. §119, the content of which in its entirety is herein incorporated by reference.

BACKGROUND

1. Field

Embodiments of the invention relate to a display device, and more particularly, to a display device in which defective fastening between a lower frame and an upper frame is effectively prevented.

2. Description of the Related Art

In general, flat panel display ("FPD") devices, such as liquid crystal display ("LCD") devices or organic light emitting diode ("OLED") display devices, include a plurality of pairs of electric field generating electrodes and an electro-optical active layer between the pair of electric field generating electrodes. An LCD device includes a liquid crystal layer as the electro-optical active layer, and an OLED display device includes an organic light emitting layer as the electro-optical active layer.

With the recent use of an LCD device as a display device in a television receiver, an overall size of a screen of an FPD device is being increased. Due to such an increase in a screen size of an FPD device, a difference in viewing angles may occur between cases in which viewers are positioned at the center of a display screen and at a side (or end) of the display screen. As used herein, the term viewing angle is defined as an angle formed between a gaze of a viewer and a tangent of a display screen, and a difference in viewing angles is termed as a viewing angle difference.

In recent, a curved display device having opposite ends disposed closer to a viewer than the center thereof to form a concave or convex shape has been recently developed to improve the difference in viewing angles. Such curved display devices may be classified, based on a viewer, into various types including a portrait-type display device having a (vertical) width greater than a (horizontal) length thereof and curved in a width direction thereof, and a landscape-type display device having a (horizontal) length greater than a (vertical) width thereof and curved in a length direction thereof.

SUMMARY

In a curved display device, an upper frame and a lower frame are coupled to one another using a fastening member, in a manner similar to that of an FPD device. A plurality of fastening members are typically disposed in coupling holes formed on respective fastening surfaces of the upper frame and the lower frame each of which has a curvature, to thereby assemble the upper frame and the lower frame together. However, since each of the fastening surfaces of the upper frame and the lower frame has a curvature, the coupling holes respectively formed in the fastening surfaces have different angles based on a horizontal plane. Accordingly, the fastening members may be desired to be assembled into the respective coupling holes by differently adjusting insertion directions of the fastening members for the respective coupling holes. As a result, an assembling speed may slow down, and defective fastening between the lower frame and the upper frame may occur in the curved display device.

Aspects of embodiments of the invention are directed to a display device capable of preventing defective fastening between a lower frame and an upper frame.

According to an exemplary embodiment of the invention, a display device includes: a display panel curved in a first direction; a lower frame in which the display panel is accommodated; an upper frame coupled to the lower frame to thereby fix the display panel; and a fastening member which couples the lower frame and the upper frame to one another. In such an embodiment, the lower frame includes a first coupling portion protruding toward the display panel, where a first coupling hole is defined in the first coupling portion, the upper frame includes a second coupling portion protruding toward the display panel, where a second coupling hole is defined in the second coupling portion, the fastening member is disposed through the first coupling hole and the second coupling hole to fasten the lower frame and the upper frame together, and a bottom portion of the first coupling portion forms an acute angle with respect to a base portion of the lower frame, and a bottom portion of the second coupling portion forms an acute angle with respect to a base portion of the upper frame.

In an exemplary embodiment, the first coupling portion may include: an inclination portion bent from the base portion of the lower frame; and the bottom portion bent from the inclination portion.

In an exemplary embodiment, the second coupling portion may include: an inclination portion bent from the base portion of the upper frame; and the bottom portion bent from the inclination portion.

In an exemplary embodiment, an acute angle formed between the base portion of the lower frame and the bottom portion of the first coupling portion may increase as the first coupling portion is further away from a center of the base portion of the lower frame.

In an exemplary embodiment, an acute angle formed between the base portion of the upper frame and the bottom portion of the second coupling portion may increase as the second coupling portion is further away from a center of the base portion of the upper frame.

In an exemplary embodiment, the bottom portion of the first coupling portion and the bottom portion of the second coupling portion may be parallel to an imaginary horizontal plane.

In an exemplary embodiment, the first coupling portion may include a plurality of coupling portions on the lower frame and the second coupling portion may include a plurality of coupling portions on the upper frame and corresponding to the coupling portions of the first coupling portion, and a value calculated by summing heights of corresponding coupling portions of the first coupling portion and the second coupling portion is a constant.

In an exemplary embodiment, the fastening member may be disposed to be perpendicular to the imaginary horizontal plane.

In an exemplary embodiment, the base portion of the lower frame may include, on an edge portion thereof in a second direction intersecting the first direction, a third coupling portion, in which a third coupling hole is defined.

In an exemplary embodiment, the base portion of the upper frame may include, on an edge portion thereof in the second direction, a fourth coupling portion, in which a fourth coupling hole is defined.

In an exemplary embodiment, the fastening member may be disposed through the third coupling hole and the fourth coupling hole to fasten the lower frame and the upper frame together.

In an exemplary embodiment, the display device may further include an intermediate frame between the lower frame and the upper frame, the intermediate frame supporting the display panel.

In an exemplary embodiment, the intermediate frame may include a fifth coupling portion on a first surface of an edge thereof in the first direction, and may include a sixth coupling portion on a second surface of an edge thereof in the first direction, where the second surface is opposite to the first surface.

In an exemplary embodiment, a fifth coupling hole may be defined through the fifth coupling portion and the sixth coupling portion of the intermediate frame.

In an exemplary embodiment, each of the fifth coupling portion and the sixth coupling portion may overlap the first coupling portion and the second coupling portion.

In an exemplary embodiment, the fastening member may be disposed through the first coupling hole, the second coupling hole and the fifth coupling hole to fasten the lower frame, the upper frame and the intermediate frame together.

In an exemplary embodiment, a sixth coupling hole may be defined in the intermediate frame on an edge portion thereof in the second direction.

In an exemplary embodiment, the fastening member may be disposed through the third coupling hole, the fourth coupling hole and the sixth coupling hole to fasten the lower frame, the upper frame and the intermediate frame together.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features of the disclosure of invention will be more clearly understood from the following detailed description taken in conjunction with the accompanying drawings, in which.

DETAILED DESCRIPTION

Figure 1:
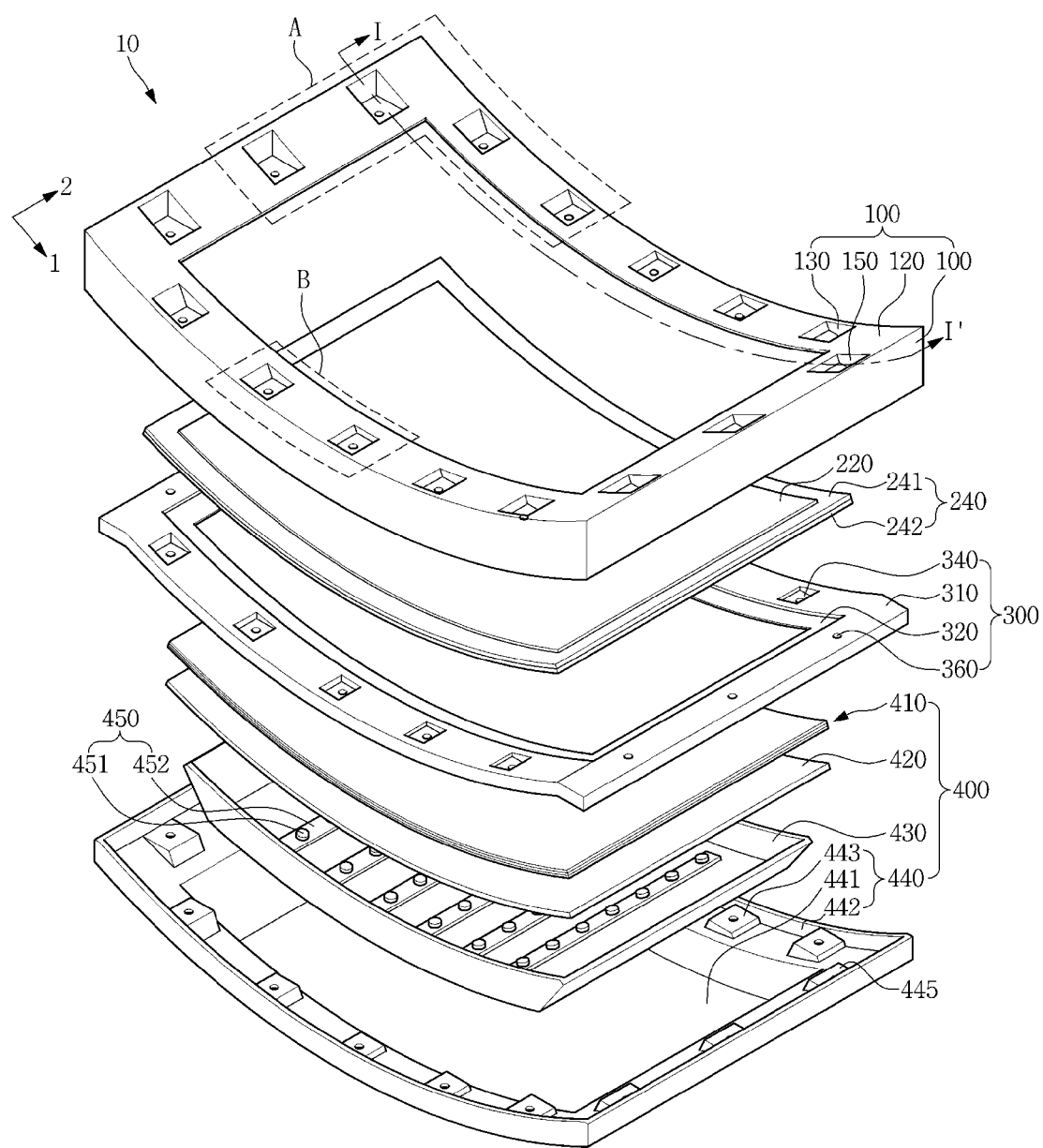
FIG. 1 is a schematic exploded perspective view illustrating a display device according to an exemplary embodiment.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, an exemplary embodiment with respect to a display device 10 will be described with reference to FIGS. 1 and 2.

FIG. 1 is a schematic exploded perspective view illustrating the display device 10 according to the exemplary embodiment. FIG. 2 is a schematic cross-sectional view taken along line I-I' of the display device 10 of FIG. 1.

Figure 2:
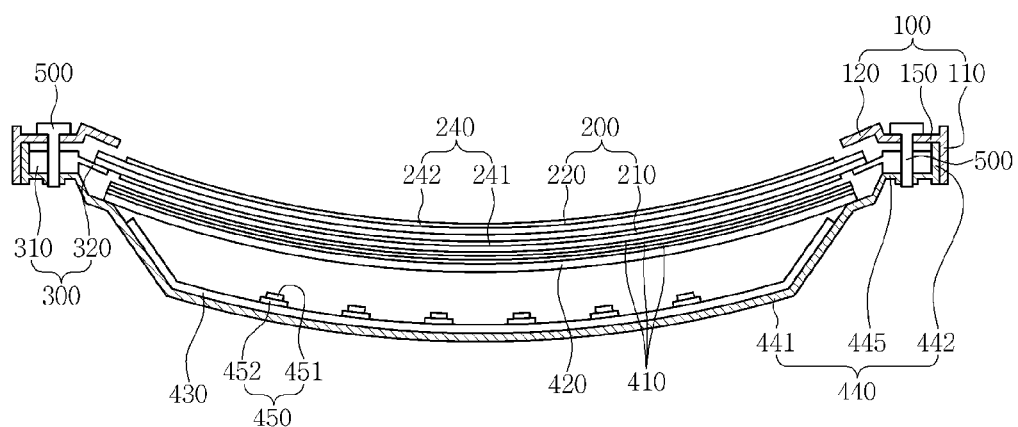
FIG. 2 is a schematic cross-sectional view taken along line I-I' of the display device of FIG. 1.

Referring to FIGS. 1 and 2, an exemplary embodiment of the display device 10 has a predetermined radius of curvature. In such an embodiment, the display device 10 is a curved display device having opposite ends positioned higher than the center of a display panel 200.

The display device 10 includes the display panel 200, a backlight assembly 400 that provides light to the display panel 200, an upper frame 100 surrounding the display panel 200, and an intermediate frame 300 on which the display panel 200 is disposed, e.g., mounted. Each of the aforementioned components has a curved shape corresponding to a curved shape of the display device 10.

The upper frame 100 is coupled to a lower frame 440 to cover the display panel 200 which is on the intermediate frame 300. The upper frame 100 defines an opening in a center portion thereof through which the display panel 200 is exposed. The upper frame 100 is disposed to cover an upper edge and a side surface of the display panel 200.

The upper frame 100 includes a side surface portion 110 that covers a side surface of the display panel 200, and a base portion 120 bent from the side surface portion 110 to cover the upper edge of the display panel 200.

In one exemplary embodiment, for example, the upper frame 100 may be coupled to the lower frame 440 through a screw coupling. In an alternative exemplary embodiment, the coupling of the upper frame 100 and the lower frame 440 may be modified in various manners. A coupling structure of the upper frame 100 and the lower frame 440 will be described in greater detail below.

The display panel 200 has a predetermined radius of curvature. In an exemplary embodiment, the display panel 200 may include or may be formed of a flexible material, and may be curved subsequently to being disposed on the lower frame 440, the intermediate frame 300, and the upper frame 100. In such an embodiment, the lower frame 440, the intermediate frame 300 and the upper frame 100 fix the display panel 200 may be curved to allow the display panel 200 to have a predetermined radius of curvature. Accordingly, each of the lower frame 440, the intermediate frame 300, and the upper frame 100 may have a predetermined radius of curvature, substantially the same as or similarly to that of the display panel 200.

The display panel 200 may be curved in various manners. In one exemplary embodiment, for example, when a direction in which an image is displayed is defined as an upward direction, and a direction opposite thereto is defined as a downward direction, the display panel 200 may be curved to have a convex shape in the downward or upward direction. However, the curved direction of the display panel 200 is not limited thereto. In one exemplary embodiment, for example, a center portion of the display panel 200 may have a convex shape in the upward direction, in other words, towards a user. In an alternative exemplary embodiment, a portion of the display panel 200 may have a convex shape in the upward direction, and another portion of the display panel 200 may have a convex shape in the downward direction.

The display panel 200 is configured to display images. In an exemplary embodiment, the display panel 200 may be a light-receiving type (or non-emissive-type) display panel including a liquid crystal display ("LCD") panel, an electrowetting display panel, an electrophoretic display ("EPD") panel, a microelectromechanical system ("MEMS") display panel, and the like. For convenience of description, an exemplary embodiment where the display panel 200 is an LCD panel will hereinafter be described, but the invention is not limited thereto.

The display panel 200 may be in a quadrangular planar shape having two pairs of parallel sides. According to an exemplary embodiment, the display panel 200 may have a rectangular shape having a pair of relatively long sides and a pair of relatively short sides. The display panel 200 includes a first substrate 210, a second substrate 220 opposing the first substrate 210, and a liquid crystal layer (not illustrated) between the first and second substrates 210 and 220. The display panel 200, when viewed from a plan view, includes a display area in which an image is displayed and a non-display area which surrounds the display area and in which an image is not displayed. The non-display area may be covered by the upper frame 100.

In an exemplary embodiment, the first substrate 210 may include a plurality of pixel electrodes (not illustrated) and a plurality of thin film transistors (not illustrated) electrically connected to the pixel electrodes in one-to-one correspondence. Each of the thin film transistors functions as a switch of a driving signal supplied to a corresponding one of the pixel electrodes. In such an embodiment, the second substrate 220 may include a common electrode (not illustrated) forming an electric field which controls an alignment of liquid crystals, along with the pixel electrodes. The display panel 200 is configured to drive the liquid crystal layer to display an image frontwards.

The display panel 200 may include a driving chip (not illustrated) configured to supply a driving signal, a tape carrier package ("TCP", not illustrated) on which the driving chip is mounted, and a printed circuit board ("PCB", not illustrated) electrically connected to the display panel 200 through the TCP. The driving chip generates a driving signal for driving the display panel 200 in response to an external signal applied thereto. The external signal is supplied from the PCB and may include an image signal, various control signals, a driving voltage, and the like.

In an exemplary embodiment, a polarizer 240 is disposed on the display panel 200, and includes a first polarizer 241 and a second polarizer 242. The first and second polarizers 241 and 242 are disposed on respective surfaces of the first and second substrates 210 and 220 that are opposite to respective surfaces of the first and second substrates 210 and 220 opposing one another. In such an embodiment, the first polarizer 241 may be attached onto an outer side of the first substrate 210, and the second polarizer 242 may be attached onto an outer side of the second substrate 220. A transmissive axis of the first polarizer 241 is substantially perpendicular with respect to a transmissive axis of the second polarizer 242.

The intermediate frame 300 is coupled to the lower frame 440 and accommodates the display panel 200 therein. The intermediate frame 300 may include a base portion 310 and a supporting portion 320 protruding from a surface of the base portion 310. The display panel 200 may be disposed, e.g., mounted, on the supporting portion 320. The intermediate frame 300 may include or may be formed of a flexible material, such as plastics, to reduce or effectively prevent damage to the display panel 200. However, the material forming the intermediate frame 300 is not limited thereto, and the intermediate frame 300 may include any other materials as long as the material allows the intermediate frame 300 to have the same shape and the same function as described above.

The intermediate frame 300 is disposed along an edge of the display panel 200 and supports the display panel 200 from therebelow. The intermediate frame 300 may be provided to correspond to four sides or at least one of the four sides of the display panel 200. In one exemplary embodiment, for example, the intermediate frame 300 may have a quadrilateral-loop shape corresponding to the four sides of the display panel 200, or may have a "[" shape, that is, a quadrilateral open-loop shape corresponding to three of the four sides of the display panel 200. The intermediate frame 300 may be provided in a single unit or integrally formed as a single unitary and indivisible unit. In an alternative exemplary embodiment, the intermediate frame 300 may include a plurality of portions to be subsequently assembled therefrom.

In an exemplary embodiment, the intermediate frame 300 may be coupled to the upper frame 100. In one exemplary embodiment, for example, screw holes may be defined or formed in the upper frame 100, the lower frame 440 and the intermediate frame 300, and subsequently, the upper frame 100, the lower frame 440 and the intermediate frame 300 may be simultaneously fastened together through a screw-coupling. A coupling structure of the upper frame 100, the lower frame 440 and the intermediate frame 300 will be described in greater detail below.

The backlight assembly 400 includes an optical sheet 410, a diffusion plate 420, a reflective sheet 430, the lower frame 440, and a light source unit 450.

The light source unit 450 includes a light source 451 and a circuit board 452 on which the light source 451 is disposed. The light source unit 450 may be disposed below the display panel 200. In one exemplary embodiment, for example, the light source unit 450 may be disposed on a bottom surface of the reflective sheet 430 or a bottom surface of the lower frame 440.

The circuit board 452 may have a curved shape. The circuit board 452 may have a rectangular shape and may include a reflective surface. In one exemplary embodiment, for example, a surface of the circuit board 452 may be treated with a reflective material. In one exemplary embodiment, for example, the circuit board 452 may be manufactured using a metal material to perform a heat dissipation function or a supporting function. The type of the metal material is not particularly limited, and may include various metals having relatively high thermal conductivity.

Although not illustrated, the circuit board 452 is divided into a mounting area and a wiring area. In an exemplary embodiment, where the light source 451 includes two or more light sources 451, the two or more light sources 451 are disposed on respective mounting areas, and a plurality of wirings for transmitting a driving power to the two or more light sources 451 are disposed on the wiring area. The driving power is generated in a power supplier (not illustrated), and is supplied to the plurality of wirings through an additional connector (not illustrated).

The light source 451 may include a light emitting diode ("LED"), or the like. The plurality of light sources 451 supply light which allows the display device 10 to display image data. The light emitted from the light source 451 is transmitted through the diffusion plate 420 and the optical sheet 410 to be guided toward the display panel 200. The light sources 451 may be arranged to be spaced apart from one another at predetermined intervals to achieve the luminance uniformity of the light source unit 450. In one exemplary embodiment, for example, the plurality of light sources 451 may be spaced apart from one another at predetermined intervals in a transverse direction and a longitudinal direction to be arranged in a matrix form. In an alternative exemplary embodiment, the light sources 451 may be arranged in parallel to one another in the longitudinal direction, and may be arranged in a zigzag manner in the transverse direction. In another alternative exemplary embodiment, the light sources 451 may be arranged in parallel to one another in the transverse direction, and may be arranged in a zigzag manner in the longitudinal direction. However, the arrangement of the light sources 451 is not limited thereto, and the light sources 451 may be arranged on the circuit board 452 in various manners to achieve luminance uniformity. In an exemplary embodiment, the circuit board 452 may have a coupling hole (not illustrated) formed therein through which a fastening member (not illustrated) is inserted to be fixed thereto.

The light source 451 may be a light emitting package including an LED. In one exemplary embodiment, for example, a light emitting package may include a red LED that emits a red light, a green LED that emits a green light, and a blue LED that emits a blue light therein. The light emitting package generates a white light by mixing lights having the three colors of red, green and blue. In an alternative exemplary embodiment, the light emitting package may only include a blue LED from among the red, green, and blue LEDs, and a phosphor for converting a blue light into a white light is included in a light emitting portion of the blue LED. The light emitted from the light source 451 is incident on the diffusion plate 420.

The diffusion plate 420 is disposed above the light source unit 450. The diffusion plate 420, as illustrated in FIGS. 1 and 2, may have a curved polyhedral shape. The diffusion plate 420 may include or may be formed of a flexible material, similarly to the display panel 200. In an exemplary embodiment, the diffusion plate 420 may be initially provided in a flat shape, and may be deformed into a curved shape in a final state of being assembled into the display device 10. In an alternative exemplary embodiment in which the diffusion plate 420 initially has a curved shape, the diffusion plate 420 may be initially formed of a rigid or non-flexible material.

The diffusion plate 420 receives light emitted from the light source unit 450 to diffuse the light. In an exemplary embodiment, the diffusion plate 420 serves to enhance the luminance uniformity of the light generated in the light source unit 450. In such an embodiment, the diffusion plate 420 allows a bright spot to be invisible from the front of the display device 10. Herein, the bright spot is an area that appears bright based on the disposition of the light source 451. In an exemplary embodiment, the diffusion plate 420 may be spaced apart from the light source unit 450 and an air layer may be disposed therebetween.

The diffusion plate 420 is attached or fixed to the lower frame 440. The diffusion plate 420 may be provided in a quadrangular planar shape, similarly to the display panel 200. However, the shape of the diffusion plate 420 is not limited thereto. According to alternative exemplary embodiments, where an LED is provided as the light source 451, the diffusion plate 420 may have various shapes including such as a predetermined groove and/or a protrusion, based on the position of the light source 451.

An exemplary embodiment, where the diffusion plate 420 has a planar shape, that is, a plate, is described herein for convenience of description. According to alternative exemplary embodiments, the diffusion plate 420 may be in a sheet or film shape to achieve slimness of the display device 10. The diffusion plate 420 is to be understood as having a concept that includes not only a plate but also a film for guiding light.

The diffusion plate 420 may include a light-transmissive material. The light-transmissive material may include or may be formed of polycarbonate ("PC"), or an acrylic resin such as polymethyl methacrylate ("PMMA") to help or improve guide light efficiently.

The optical sheet 410 is disposed on the diffusion plate 420 and diffuses and/or collimates light transmitted from the diffusion plate 420. The optical sheet 410 may have a curved shape. The optical sheet 410 may include or may be formed of a flexible material, similarly to the display panel 200. In an exemplary embodiment, the optical sheet 410 may be initially provided in a flat shape, and may be deformed into a curved shape in a final state of being assembled into the display device 10. In an alternative exemplary embodiment in which the optical sheet 410 initially has a curved shape, the optical sheet 410 may be initially formed of a rigid or non-flexible material.

The optical sheet 410 may include a diffusion sheet, a prism sheet, a protective sheet, and the like.

The diffusion sheet may disperse a light incident thereon from the diffusion plate 420 to thereby prevent the light from being partially concentrated.

The prism sheet may include, on a surface thereof, prisms having a triangular cross-section and provided in a predetermined array. The prism sheet may be disposed on the diffusion sheet to collimate light diffused from the diffusion sheet in a direction perpendicular with respect to the display panel 200.

The protective sheet may be disposed on the prism sheet, may protect a surface of the prism sheet, and may diffuse light to achieve uniform light distribution.

The reflective sheet 430 is interposed between the light source unit 450 and the lower frame 440, and reflects a light emitted downwardly from the diffusion plate 420 to allow the light to be directed toward the display panel 200, thereby improving light efficiency. The reflective sheet 430 may have a curved shape.

The reflective sheet 430 includes a bottom surface portion and a wing extending from the bottom surface portion to form an obtuse angle with respect thereto. The bottom surface portion and the wing of the reflective sheet 430 may be disposed or mounted on the lower frame 440.

The reflective sheet 430 may include or may be formed of, for example, polyethylene terephthalate ("PET"), thus having reflectivity. A surface of the reflective sheet 430 may be coated with a diffusion layer including, for example, titanium dioxide ($TiO_2$).

According to alternative exemplary embodiments, the reflective sheet 430 may include or may be formed of a material including a metal, such as silver (Ag).

The lower frame 440 accommodates the light source unit 450, the optical sheet 410, the reflective sheet 430 and the diffusion plate 420. The lower frame 440 may have a curved shape.

The lower frame 440 may include a base portion 441 and a side wall portion 442 bent from the base portion 441 to extend therefrom. The base portion 441 of the lower frame 440 is parallel to the diffusion plate 420.

The lower frame 440 may include or may be formed of a metal material having relatively high rigidity such as stainless steel, or a material having a relatively high heat dissipation property such as aluminum (Al) or an Al alloy. In such an embodiment, the lower frame 440 maintains a framework of the display device 10, and protects various components accommodated therein.

An exemplary embodiment of a curved display device having a coupling structure that is capable of preventing defective fastening of the upper frame 100, the intermediate frame 300 and the lower frame 440 and is enhanced with process efficiency will be described in greater detail hereinbelow with reference to FIGS. 2, 3, 4, and 5. Herein, as illustrated in FIGS. 1 and 4, a first direction 1 may be a direction of a long side of the upper frame 100, that is, a length direction of the upper frame 100, and a second direction 2 may be a direction of a short side of the upper frame 100, that is, a width direction of the upper frame 100.

Figure 3:
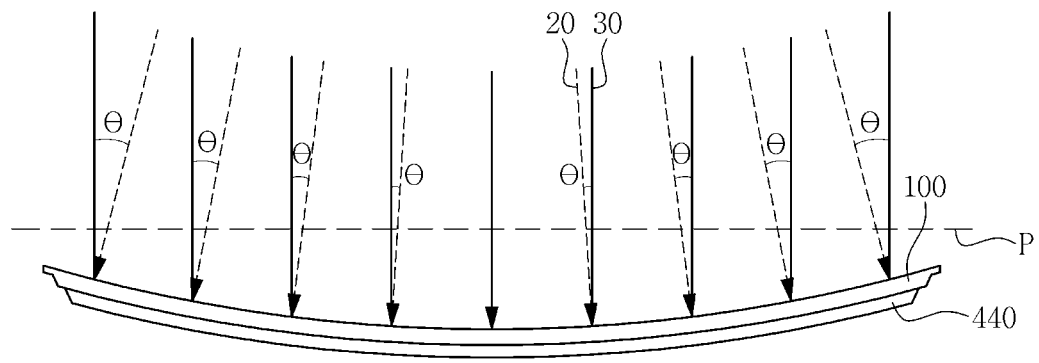
FIG. 3 is a view illustrating a comparison between fastening directions of a conventional display device and fastening directions of a display device according to an exemplary embodiment.

FIG. 3 is a view illustrating a comparison between fastening directions of a conventional display device and fastening directions of the display device 10 according to an exemplary embodiment. FIG. 4 is an enlarged view illustrating portion "A" of FIG. 1. FIG. 5 is an enlarged view illustrating portion "B" of FIG. 1.

Referring to FIG. 3, in a conventional display device, a fastening direction 20 of a screw for coupling the upper frame 100 and the lower frame 440 to one another may be different for each fastening point. Accordingly, in a conventional display device where the lower frame 440 and the upper frame 100, each of which has a curvature, is assembled together, the fastening direction of the lower frame 440 and the upper frame 100 may be differently adjusted for each fastening point. Thus, the fastening between the lower frame 440 and the upper frame 100 may be defective. In an exemplary embodiment, each of the upper frame 100 and the lower frame 440 may have a plurality of coupling portions at respective fastening points.

Figure 4:
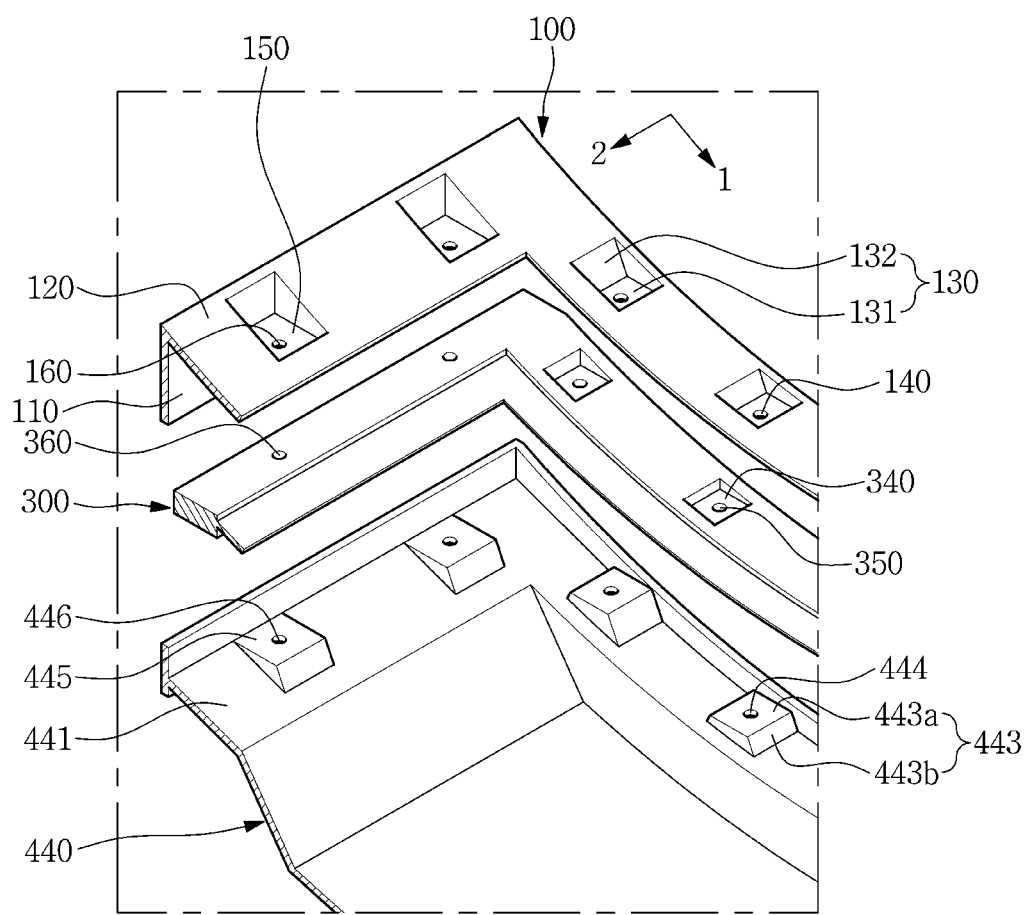
FIG. 4 is an enlarged view illustrating portion "A" of FIG. 1.
Figure 5:
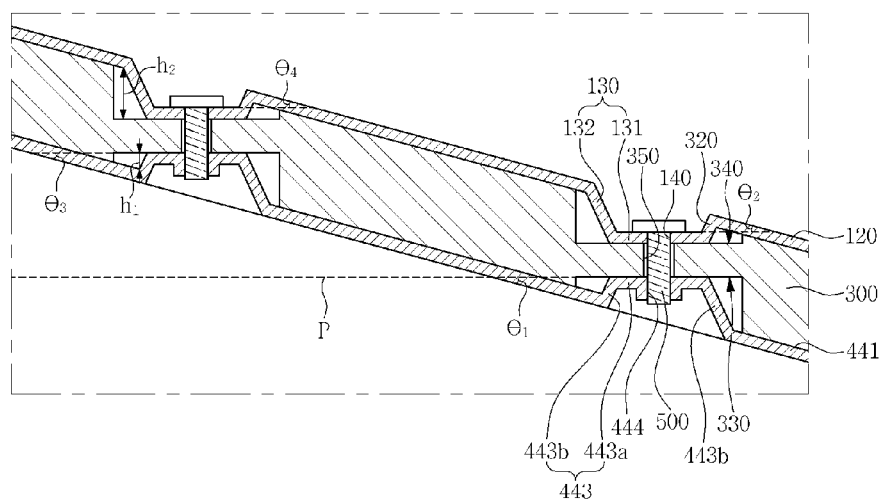
FIG. 5 is an enlarged view illustrating portion "B" of FIG. 1.

Referring to FIGS. 4 and 5, in an exemplary embodiment, the display panel 200 may be curved in the first direction 1. The lower frame 440 accommodates the display panel 200. The lower frame 440 includes a first coupling portion 443 protruding toward the display panel 200, and a first coupling hole 444 is defined in the first coupling portion 443. In one exemplary embodiment, for example, the lower frame 440 has a curvature in the first direction 1, and includes the plurality of first coupling portions 443 on an edge portion thereof in the first direction 1. The first coupling portion 443 is disposed on the base portion 441.

In an exemplary embodiment, the first coupling portion 443 includes an inclination portion 443b bent from the base portion 441 of the lower frame 440 and a bottom portion 443a bent from the inclination portion 443b. In such an embodiment, the first coupling hole 444 is defined in the bottom portion 443a.

In an exemplary embodiment, the bottom portion 443a of the first coupling portion 443 forms an acute angle with respect to the base portion 441 of the lower frame 440. In such an embodiment, the acute angle formed between the base portion 441 of the lower frame 440 and the bottom portion 443a of the first coupling portion 443 increases as the first coupling portion 443 is further away from the center of the base portion 441 of the lower frame 440. In such an embodiment, the center of the base portion 441 may correspond to the center of an edge of the base portion 441. In one exemplary embodiment, for example, as illustrated in FIG. 5, an acute angle $\theta_1$ formed between the base portion 441 and a bottom portion 443a of a first coupling portion 443 that is relatively adjacent to the center of the base portion 441 is less than an acute angle $\theta_3$ formed between the base portion 441 and a bottom portion 443a of a first coupling portion 443 that is relatively remote from the center of the base portion 441. In this manner, the acute angle formed between the base portion 441 of the lower frame 440 and the bottom portion 443a of the first coupling portion 443 may be adjusted to allow the bottom portion 443a of the first coupling portion 443 to be parallel to an imaginary horizontal plane P.

In such an embodiment, the base portion 441 of the lower frame 440 includes, on an edge portion thereof in the second direction 2 that intersects the first direction 1, a third coupling portion 445 in which a third coupling hole 446 is defined.

In an exemplary embodiment, since the first coupling portion 443 is disposed on a side of the base portion 441 that has a curvature, the angle formed between the bottom portion 443a of the first coupling portion 443 and the base portion 441 of the lower frame 440 varies based on a position to form the first coupling portion 443. In one exemplary embodiment, for example, where the first coupling portions 443 is disposed on an edge of the base portion 441 having a curvature in the first direction 1, the angle formed between the bottom portion 443a of the first coupling portion 443 and the base portion 441 is adjusted for respective positions to form the first coupling portions 443. However, in such an embodiment, the third coupling portions 445 is disposed on an edge of the base portion 441 having no curvature in the second direction 2, an angle formed between a bottom surface of the third coupling portion 445 and the base portion 441 is the same at all positions of the third coupling portions 445 because the fastening direction of a coupling portion on a short side of the lower frame 440 is the same at all fastening points. In such an embodiment, there is no variation in angles, each of which is formed between a bottom surface of the coupling portion on the short side of the lower frame 440 and the base portion 441 of the lower frame 440.

The upper frame 100 is coupled to the lower frame 440 to thereby fix the display panel 200 in a space defined therebetween. The upper frame 100 includes a second coupling portion 130 protruding toward the display panel 200, and a second coupling hole 140 is defined in the second coupling portion 130. In one exemplary embodiment, for example, the upper frame 100 has a curvature in the first direction 1, and includes a plurality of second coupling portions 130 on an edge portion thereof in the first direction 1. The second coupling portion 130 is disposed in the base portion 120 of the upper frame 100.

In an exemplary embodiment, the second coupling portion 130 includes an inclination portion 132 bent from the base portion 120 of the upper frame 100 and a bottom portion 131 bent from the inclination portion 132. In such an embodiment, the second coupling hole 140 is defined in the bottom portion 131.

The bottom portion 131 of the second coupling portion 130 forms an acute angle with respect to the base portion 120 of the upper frame 100. In an exemplary embodiment, the acute angle formed between the base portion 120 of the upper frame 100 and the bottom portion 131 of the second coupling portion 130 increases as the second coupling portion 130 is further away from the center of the base portion 120 of the upper frame 100. In such an embodiment, the center of the base portion 120 may correspond to the center of an edge of the base portion 120. In one exemplary embodiment, for example, as illustrated in FIG. 5, an acute angle $\theta_2$ formed between the base portion 120 and a bottom portion 131 of a second coupling portion 130 that is relatively adjacent to the center of the base portion 120 is less than an acute angle $\theta_4$ formed between the base portion 120 and a bottom portion 131 of a second coupling portion 130 that is relatively remote from the center of the base portion 120. In this manner, the acute angle formed between the base portion 120 of the upper frame 100 and the bottom portion 131 of the second coupling portion 130 may be adjusted to allow the bottom portion 131 of the second coupling portion 130 to be parallel to the imaginary horizontal plane P.

In such an embodiment, the base portion 120 of the upper frame 100 includes, on an edge portion thereof in the second direction 2, a fourth coupling portion 150, in which a fourth coupling hole 160 is defined.

In such an embodiment, since the second coupling portion 130 is formed on a side of the base portion 120 that has a curvature, the angle formed between the bottom portion 131 of the second coupling portion 130 and the base portion 120 of the upper frame 100 varies based on a position to form the second coupling portion 130. In one exemplary embodiment, for example, where the second coupling portions 130 is disposed on an edge of the base portion 120 having a curvature in the first direction 1, the angle formed between the bottom portion 131 of the second coupling portion 130 and the base portion 120 is adjusted for respective positions to form the second coupling portions 130. However, in such an embodiment, the fourth coupling portions 150 is disposed on an edge of the base portion 120 having no curvature in the second direction 2, an angle formed between a bottom surface of the fourth coupling portion 150 and the base portion 120 is the same at all positions to form the fourth coupling portions 150 because the fastening direction of a coupling portion on a short side of the upper frame 100 is the same in all fastening points. In such an embodiment, there is no variation in angles each of which is formed between a bottom surface of the coupling portion on the short side of the upper frame 100 and the base portion 120 of the lower frame 100.

As illustrated in FIG. 5, a value calculated by summing a height h1 of the inclination portion 443b of the first coupling portion 443 and a height h2 of the inclination portion 132 of the second coupling portion 130 corresponding thereto is invariably the same, e.g., a constant, regardless of the position thereof in the upper or lower frames 100 or 200. In such an embodiment, although a position at which the first coupling portion 443 and the second coupling portion 130 are disposed varies, summing a height h1 of the inclination portion 443b of the first coupling portion 443 and a height h2 of the inclination portion 132 of the second coupling portion 130 at each position is the same constant value.

The fastening member 500 is configured to couple the upper frame 100 and the lower frame 440 to one another. In one exemplary embodiment, for example, the fastening member 500 penetrates or is disposed through the first coupling hole 444 and the second coupling hole 140 on a long side of the display device 10 and penetrates or is disposed through the third coupling hole 446 and the fourth coupling hole 160 on a short side of the display device 10, to couple the lower frame 440 and the upper frame 100 to one another.

In an exemplary embodiment, as illustrated in FIGS. 4 and 5, the display panel 200 further includes the intermediate frame 300 for supporting the display panel 200. In an alternative exemplary embodiment, the intermediate frame 300 may be omitted, and the lower frame 440 may directly support the display panel 200.

In an exemplary embodiment, the intermediate frame 300 includes fifth coupling portions 330 on one surface (e.g., an upper surface or a first surface) of an edge portion thereof in the first direction 1, and sixth coupling portions 340 are defined on another surface (e.g., a lower surface or a second surface opposite to the first surface) of an edge portion thereof in the first direction 1. In such an embodiment a fifth coupling hole 350 is defined in the intermediate frame 300 through the fifth coupling portion 330 and the sixth coupling portion 340, and sixth coupling holes 360 are defined in the intermediate frame 300 on an edge thereof in the second direction 2. The fifth coupling portion 330 and the sixth coupling portion 340 overlap the first coupling portion 443 and the second coupling portion 130. In such an embodiment, the fifth coupling portion 330 may contact the bottom portion 443a of the first coupling portion 443, and the sixth coupling portion 340 may contact the bottom portion 131 of the second coupling portion 130.

In an exemplary embodiment, where the display panel 200 further includes the intermediate frame 300, the fastening member 500 penetrates or is disposed through the first coupling hole 444, the fifth coupling hole 350 and the second coupling hole 140 on a long side of the display device 10, and penetrates or is disposed through the third coupling hole 446, the sixth coupling hole 360 and the fourth coupling hole 160 on a short side of the display device 10, to couple the upper frame 100, the intermediate frame 300 and the lower frame 440 to one another.

In an exemplary embedment, where such a coupling structure is applied to the display device 10, a fastening direction 30 for each fastening point of a screw may be the same as a direction perpendicular to the imaginary horizontal plane P as illustrated in FIG. 3.

As set forth above, according to one or more exemplary embodiments, the display device may reduce or effectively prevent the defective fastening between the upper frame and the lower frame, and may enhance process efficiency.

From the foregoing, it will be appreciated that various embodiments in accordance with the disclosure have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A display device comprising:
a display panel curved in a first direction;
a lower frame curved in the first direction in which the display panel is accommodated;
an upper frame curved in the first direction and coupled to the lower frame to fix the display panel; and
a fastening member which couples the lower frame and the upper frame to one another,
wherein
the lower frame comprises a first coupling portion protruding toward the display panel, wherein a first coupling hole is defined in the first coupling portion,
the upper frame comprises a second coupling portion protruding toward the display panel, wherein a second coupling hole is defined in the second coupling portion,
the fastening member is disposed through the first coupling hole and the second coupling hole to fasten the lower frame and the upper frame together,
wherein the first coupling portion includes a first inclination portion bent from a base portion of the lower frame and a first bottom portion bent from the first inclination portion, and
the second coupling portion includes a second inclination portion bent from a base portion of the upper frame and a second bottom portion bent from the second inclination portion,
wherein a height of the first inclination portion between the lower frame and the first bottom portion varies depending on a position of the base portion of the lower frame from which the first inclination portion is bent,
a height of the second inclination portion between the upper frame and the second bottom portion varies depending on a position of the base portion of the upper frame from which the second inclination portion is bent,
wherein the first bottom portion of the first coupling portion forms an acute angle with respect to the base portion of the lower frame, and
the second bottom portion of the second coupling portion forms an acute angle with respect a a base portion of the upper frame.

2. The display device of claim 1, wherein an acute angle formed between the base portion of the lower frame and the first bottom portion of the first coupling portion increases as the first coupling portion is further away from a center of the base portion of the lower frame.

3. The display device of claim 2, wherein an acute angle formed between the base portion of the upper frame and the second bottom portion of the second coupling portion increases as the second coupling portion is further away from a center of the base portion of the upper frame.

4. The display device of claim 3, wherein the first bottom portion of the first coupling portion and the second bottom portion of the second coupling portion are parallel to an imaginary horizontal plane.

5. The display device of claim 4, wherein
the first coupling portion comprises a plurality of coupling portions on the lower frame,
the second coupling portion comprises a plurality of coupling portions on the upper frame and corresponding to the coupling portions of the first coupling portion, and
a value calculated by summing heights of corresponding coupling portions of the first coupling portion and the second coupling portion is a constant.

6. The display device of claim 4, wherein the fastening member is disposed to be perpendicular to the imaginary horizontal plane.

7. The display device of claim 1, wherein the base portion of the lower frame comprises, on an edge portion thereof in a second direction intersecting the first direction, a third coupling portion, in which a third coupling hole is defined.

8. The display device of claim 7, wherein the base portion of the upper frame comprises, on an edge portion thereof in the second direction, a fourth coupling portion, in which a fourth coupling hole is defined.

9. The display device of claim 8, wherein the fastening member is disposed through the third coupling hole and the fourth coupling hole to fasten the lower frame and the upper frame together.

10. The display device of claim 9, further comprising:
an intermediate frame between the lower frame and the upper frame,
wherein the intermediate frame supports the display panel.

11. The display device of claim 10, wherein the intermediate frame comprises:
a fifth coupling portion on a first surface of an edge portion thereof in the first direction; and
a sixth coupling portion on a second surface of an edge portion thereof in the first direction, wherein the second surface is opposite to the first surface.

12. The display device of claim 11, wherein
a fifth coupling hole is defined through the fifth coupling portion and the sixth coupling portion of the intermediate frame.

13. The display device of claim 12, wherein each of the fifth coupling portion and the sixth coupling portion overlaps the first coupling portion and the second coupling portion.

14. The display device of claim 13, wherein the fastening member is disposed through the first coupling hole, the second coupling hole and the fifth coupling hole to fasten the lower frame, the upper frame and the intermediate frame together.

15. The display device of claim 14, wherein a sixth coupling hole is defined in the intermediate frame on an edge portion thereof in the second direction.

16. The display device of claim 15, wherein the fastening member is disposed through the third coupling hole, the fourth coupling hole and the sixth coupling hole to fasten the lower frame, the upper frame and the intermediate frame together.

* * * * *